(12) United States Patent
Kuriakose

(10) Patent No.: US 7,264,305 B2
(45) Date of Patent: Sep. 4, 2007

(54) DECK ASSEMBLY FOR TRANSPORTER VEHICLE

(75) Inventor: Sanjeev Kuriakose, Shippensburg, PA (US)

(73) Assignee: Jerr-Dan Corporation, Greencastle, PA (US)

( * ) Notice: Subject to any disclaimer, the term of this patent is extended or adjusted under 35 U.S.C. 154(b) by 0 days.

(21) Appl. No.: 11/255,190

(22) Filed: Oct. 20, 2005

(65) Prior Publication Data

US 2006/0087152 A1    Apr. 27, 2006

Related U.S. Application Data

(60) Provisional application No. 60/619,965, filed on Oct. 20, 2004.

(51) Int. Cl.
*B62D 24/20* (2006.01)

(52) U.S. Cl. ............... 296/193.07; 296/204; 296/35.1

(58) Field of Classification Search ............ 296/184.1, 296/193.07, 29, 35.1, 35.3, 204
See application file for complete search history.

(56) References Cited

U.S. PATENT DOCUMENTS

| | | | | |
|---|---|---|---|---|
| 3,843,189 | A * | 10/1974 | Duff et al. | ............ 296/29 |
| 4,212,405 | A | 7/1980 | Schmidt | |
| 4,281,235 | A | 7/1981 | Peloquin | |
| D284,274 | S | 6/1986 | Shoup | |
| 4,709,435 | A * | 12/1987 | Stemler et al. | ............ 14/73 |
| 4,758,128 | A * | 7/1988 | Law | ............ 414/477 |
| 4,838,605 | A * | 6/1989 | Abromavage | ............ 296/184.1 |
| 4,842,470 | A | 6/1989 | Hubbard | |
| 4,900,217 | A | 2/1990 | Nelson | |
| 4,951,992 | A | 8/1990 | Hockney | |
| 5,011,362 | A | 4/1991 | Pijanowski | |
| 5,263,807 | A | 11/1993 | Pijanowski | |
| 5,271,705 | A | 12/1993 | Pijanowski | |
| 5,655,792 | A | 8/1997 | Booher | |
| 5,863,091 | A * | 1/1999 | Shepherd et al. | ............ 296/204 |
| 6,045,316 | A | 4/2000 | Dole | |
| 6,109,684 | A | 8/2000 | Reitnouer | |
| 6,283,538 | B1 | 9/2001 | Reitnouer | |
| 6,523,883 | B1 | 2/2003 | Bergstrom et al. | |
| 6,893,076 | B1 | 5/2005 | Lewis | |

FOREIGN PATENT DOCUMENTS

| | | |
|---|---|---|
| DE | 92 15 533 U1 | 7/1993 |
| EP | 0 035 449 A1 | 9/1981 |
| EP | 0 248 127 A1 | 12/1987 |

OTHER PUBLICATIONS

International Search Report and Written Opinion for Application No. PCT/US2005/037971, date of mailing Feb. 13, 2006, 10 pages.

* cited by examiner

*Primary Examiner*—Dennis H. Pedder
(74) *Attorney, Agent, or Firm*—Foley & Lardner LLP

(57) ABSTRACT

A deck assembly for use with a transporter vehicle is provided. The deck assembly comprises a deck portion formed of a first material and a sub-structure formed of a second material. The deck assembly further comprises an interface plate formed disposed between the deck portion and sub-structure to facilitate coupling the deck portion to the sub-structure and/or to compensate for differences in thermal expansion that may exist between the deck portion and the sub-structure.

22 Claims, 8 Drawing Sheets

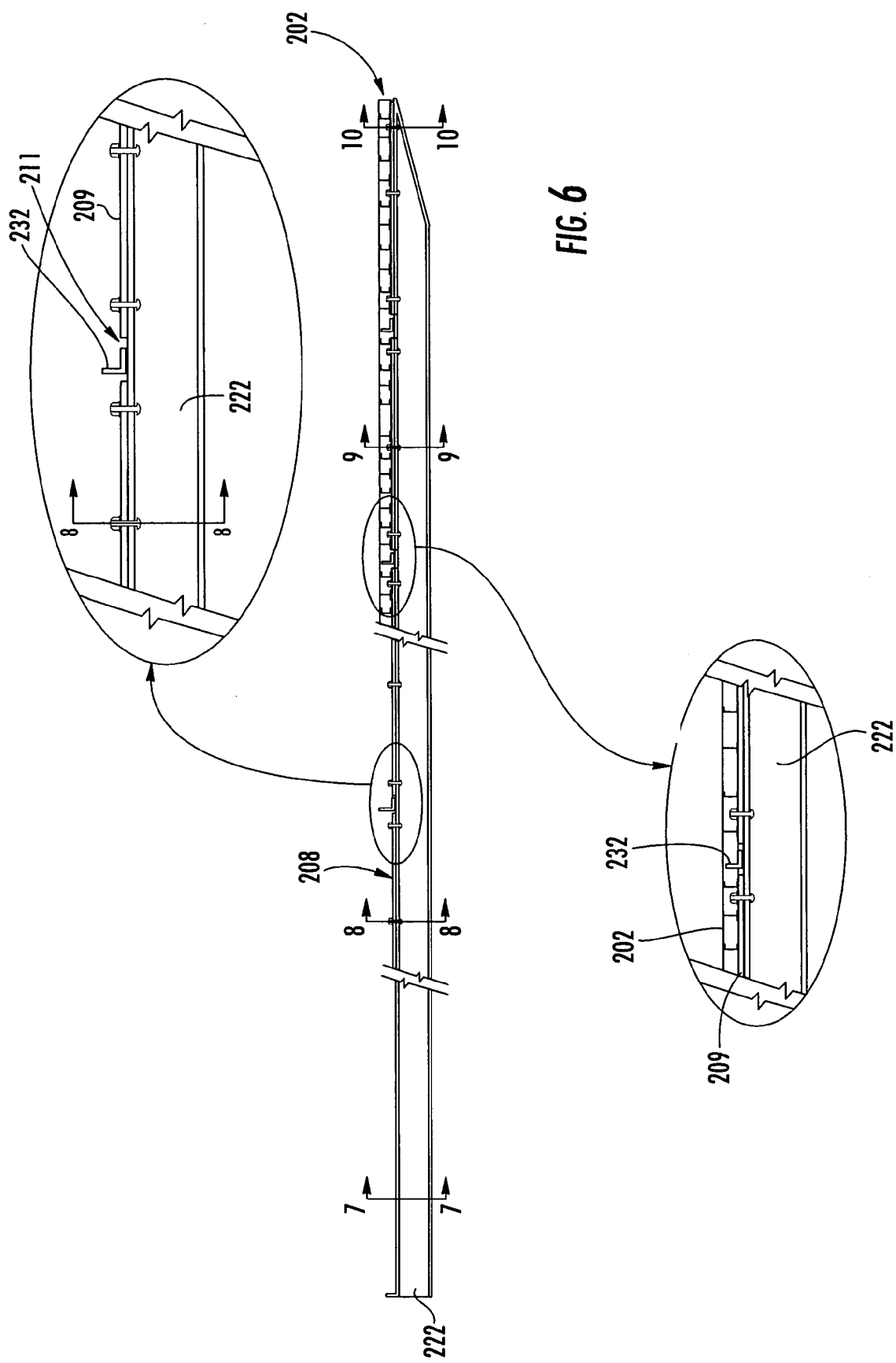

DECK ASSEMBLY FOR TRANSPORTER VEHICLE

CROSS-REFERENCE TO RELATED PATENT APPLICATIONS

This application claims the benefit under 35 U.S.C. 119(e) of U.S. Provisional Application No. 60/619,965, having a filing date of Oct. 20, 2004, titled "ALUMINUM CARRIER BED WITH STEEL BEAM STRUCTURE," the disclosure of which is hereby incorporated by reference.

BACKGROUND

The present invention relates generally to the field of transporter vehicles (e.g., carriers, roll-back type transporting vehicles, flat bed trucks, etc.). More specifically, the present invention relates to the construction and/or assembly of a deck assembly (e.g., carrier bed, platform, support surface, etc.) suitable for use with a transporter vehicle.

Transporter vehicles have a deck assembly defining a surface suitable for supporting a load (e.g., a vehicle, industrial equipment, containers, etc.). A carrier truck is a type of transporter vehicle that includes a deck assembly (i.e., a roll-back deck, etc.) that is movably supported upon a chassis and/or sub-frame of the carrier truck. The deck assembly of the carrier truck is tiltable relative to the chassis between a transport position, at which the deck assembly extends parallel to the chassis, and a loading position, at which the deck assembly extends at an angle relative to the chassis and contacts the ground, defining an approach angle. A vehicle or other load to be transported upon the surface defined by the deck assembly is moved upwardly onto the surface, and the deck assembly is then returned to the transport position.

Conventional deck assemblies of transporter vehicles are typically constructed entirely of steel (i.e., an all-steel deck assembly), or are constructed using aluminum support beams that are welded to an aluminum sub-structure (i.e., an all-aluminum deck assembly). While conventional all-aluminum deck assemblies are light in weight relative to the all-steel deck assemblies, and corrosion resistant, conventional all-aluminum deck assemblies in comparison to conventional all-steel deck assemblies have certain disadvantages. All-aluminum deck assemblies have a somewhat limited weight-bearing capacity in comparison to all-steel deck assemblies, are also more flexible than often desired, and tend to wear due to the softness of the aluminum.

Accordingly, there is a need for a transporter vehicle having a deck assembly that combines certain advantages of an all-steel deck assembly with certain advantages of an all-aluminum deck assembly. There is also a need for a deck assembly that is more rigid than an all-aluminum deck assembly, but lighter in weight than an all-steel deck assembly. There is also a need for a deck assembly formed of a combination of materials to compensate for the differences in thermal expansion that may exist between the materials. There is also a need for a deck assembly that allows a deck portion formed of aluminum to be welded over a sub-structure formed of steel.

It would be desirable to provide a transporter vehicle and/or deck assembly that provides one or more of these or other advantageous features as may be apparent to those reviewing this disclosure. The teachings disclosed extend to those embodiments which fall within the scope of the appended claims, regardless of whether they accomplish one or more of the above-mentioned needs.

SUMMARY

An exemplary embodiment of the present invention relates to a deck assembly for a transporter vehicle. The deck assembly includes a deck portion defining a deck surface and formed of a first material, a sub-structure including a first support beam having a length and formed of a second material, and an interface portion separating the deck portion from the sub-structure. The first material has a coefficient of thermal expansion that is different than a coefficient of thermal expansion for the second material.

Another exemplary embodiment of the present invention relates to a transporter vehicle. The transporter vehicle includes a chassis, a cab supported on the chassis, a sub-frame assembly supported on the chassis, and a deck assembly supported by the sub-frame and configured to be tilted by a powered actuator. The deck assembly includes a sub-structure including a first longitudinally extending support beam having a length and formed of a first material, an interface plate coupled along the length of the first support beam and formed of a second material, and a deck portion welded to the interface plate and formed of the second material. The first material has a coefficient of thermal expansion that is less than a coefficient of thermal expansion for the second material.

Another exemplary embodiment of the present invention relates to a method of assembling a deck assembly for a transporter vehicle. The method includes the steps of providing a sub-structure including at least one support beam having a length and formed of a first material, coupling an interface plate formed of a second material to the support beam, and welding a deck portion to the interface plate. The first material has a coefficient of thermal expansion that is different than a coefficient of thermal expansion for the second material.

BRIEF DESCRIPTION OF THE DRAWINGS

FIG. 6 is a segmented side plan view of the sub-structure shown in FIG. 3 with a deck portion of the deck assembly.

DETAILED DESCRIPTION

Figure 1:
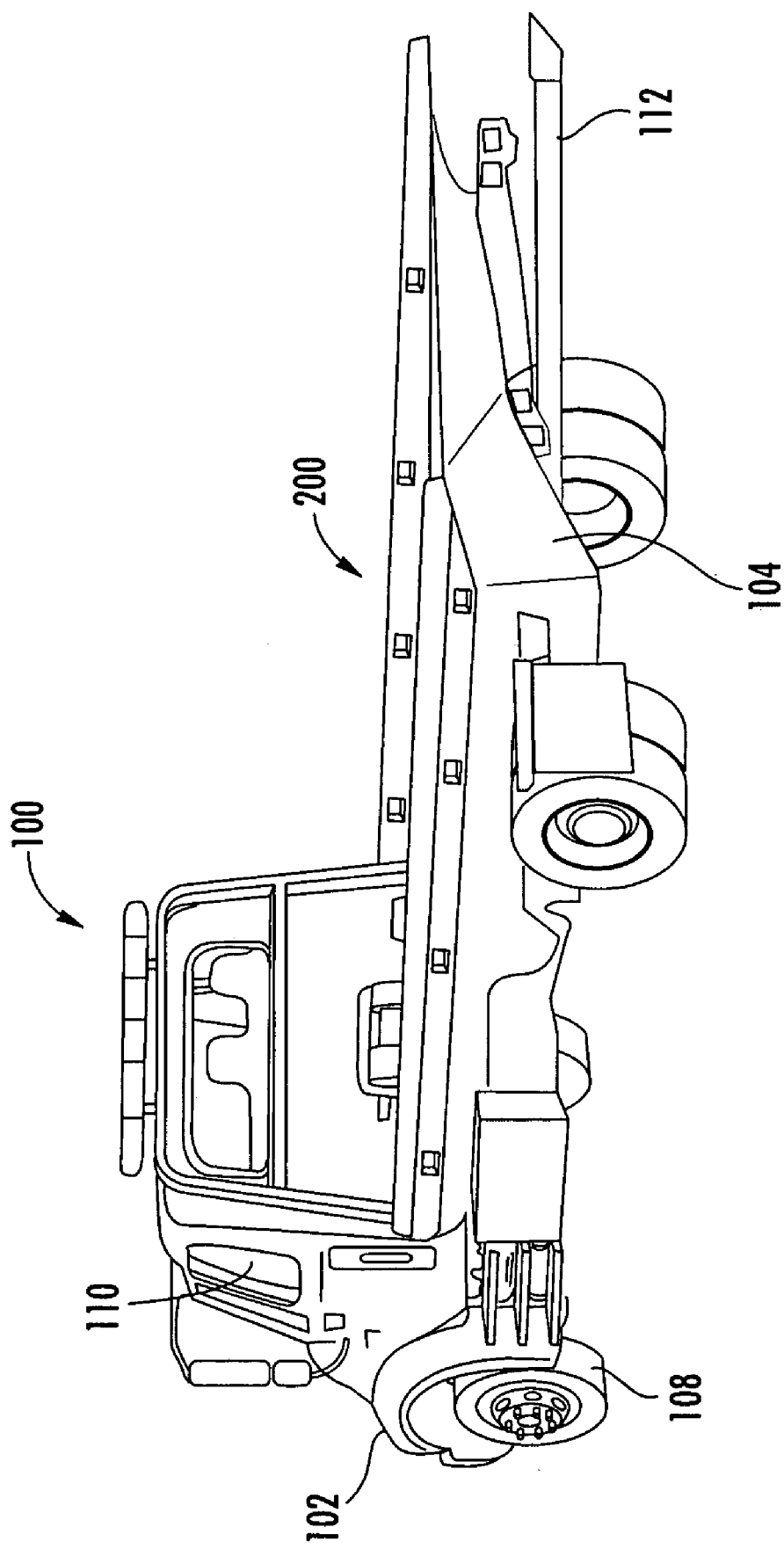
FIG. 1 is a perspective view of a transporter vehicle having a deck assembly according to an exemplary embodiment.

FIG. 1 illustrates an exemplary embodiment of a transporter vehicle (e.g., recovery vehicle, flat bed truck, towing apparatus, etc.), shown as a carrier 100. The carrier 100 is a roll-back type transporter vehicle having a tiltable deck assembly 200 configured support a load (e.g., a disabled vehicle, industrial equipment, container, etc.). Referring generally to all of the FIGURES, the deck assembly 200 generally comprises a deck portion 202 formed of a first material and an undercarriage or sub-structure 204 formed of a second material. To facilitate coupling the deck portion 202 to the sub-structure 204, and/or to compensate for any differences in thermal expansion that may exist between the material forming the deck portion 202 and the material forming the sub-structure 204, an intermediate layer 208 (e.g., an interface plate, a plurality of interface plates, etc.) is provided therebetween.

According to one non-exclusive exemplary embodiment, the deck portion 202 is formed of a material that is relatively light-weight and resistant to corrosion (e.g., aluminum, etc.) and the sub-structure 204 is formed of a material that is relatively rigid or strong (e.g., steel, etc.) to support the deck portion 202. For a variety of reasons (e.g., cost, efficiency, strength of joint, etc.), in such an embodiment, it may be desirable to couple the deck portion 202 to the sub-structure 204 using a welding operation. Forming the intermediate layer 208 of the same or similar material as the deck portion 202 allows the deck portion 202 to be readily welded over the sub-structure 204 by being welded directly to the intermediate layer 208. Coupling of the intermediate layer 208 to the sub-structure 204 may be achieved using one or more mechanical fasteners.

In addition to providing an interface for coupling the deck portion 202 relative to the sub-structure 204, the intermediate layer 208 may assist in compensating for any differences in thermal expansion that may exist between the material forming the deck portion 202 and the material forming the sub-structure 204. In an exemplary embodiment wherein the deck portion 202 is formed of aluminum and the sub-structure 204 is formed of steel, the material forming the deck portion 202 has a coefficient of thermal expansion that is greater than a coefficient of thermal expansion for the material forming the sub-structure 204. The relative expansion of aluminum with steel for a temperature range of over 300 degrees Fahrenheit is approximately 0.35 inches. Forming the intermediate layer 208 of a material having substantially the same coefficient of thermal expansion as the material forming the deck portion 202 may provide a buffer between the deck portion 202 and the sub-structure 204.

To further compensate for the differences in thermal expansion between the deck portion 202 and the sub-structure 204, the intermediate layer 208 may be in the form of a plurality of interface plates, each interface plate being provided along a different segment of the sub-structure 204 and spaced apart from the remainder of the interface plates. A gap between the interface plates is sufficiently sized to allow the deck portion 202 and the sub-structure 204 to expand and contract relative to each other due to the different coefficients of the thermal expansion without adversely affecting the joint between the two structures. The gap may also be sufficiently sized to receive a cross support member of the sub-structure 204 used for further bracing the deck assembly 200.

Compensating for the differences in coefficients of thermal expansion that may exist between the deck portion 202 and the sub-structure 204 may be particularly relevant if the carrier 100 is used in an environment in which the temperatures range from one extreme (e.g., a winter season wherein the ambient temperature may reach below 0 degrees Fahrenheit, etc.) to another (e.g., a summer season wherein the ambient temperature may exceed 100 degrees Fahrenheit, etc.).

The deck assembly 200 is intended overcome disadvantages generally associated with all-aluminum deck assemblies and those associated with all-steel deck assemblies. For example, the deck assembly 200 has increased strength (i.e., reduced deflection, torsion and/or bending, etc.) and improved wear in comparison to an all-aluminum deck assembly. Further, the deck assembly 200 is substantially lighter in weight than an all-steel deck assembly.

It should be understood that, although the deck assembly 200 is described in detail herein with reference to a deck portion 202 formed of aluminum and a sub-structure formed of steel, the deck assembly 200 disclosed herein may be formed of any other combination of suitable materials including, but not limited to, alloys, bi-metals, plastics, composites (e.g., fiberglass, etc.), etc.

It should further be understood that, although the deck assembly 200 will be described in detail herein with reference to the carrier 100, the deck assembly 200 disclosed herein may be applied to, and find utility in, other types of transporter vehicles as well. For example, the deck assembly may be suitable for use with transporter vehicles having a stationary deck assembly or any other transporter vehicle having a deck or platform configured to support a load.

Referring further to FIG. 1, the carrier 100 generally includes a chassis (e.g., a truck bed frame, etc.) functioning as a support structure for the components of the carrier 100 and is typically in the form of a frame assembly. According to an exemplary embodiment, the chassis includes first and second frame members (not shown) that are arranged as two generally parallel chassis rails extending in a fore and aft direction between a first end 102 (a forward portion of the carrier 100) and a second end 104 (a rearward portion of the carrier 100). The first and second frame members are configured as elongated structural or supportive members (e.g., a beam, channel, tubing, extrusion, etc.) spaced apart laterally and defining a void or cavity (not show) which generally constitutes the centerline of the carrier 100.

A plurality of drive wheels 108 are rotatably coupled to the chassis. The number and/or configuration of the wheels 108 may vary depending on the embodiment. According to the embodiment illustrated, the carrier 100 utilizes six wheels 108 (a tandem wheel set at the second end 104 and a single wheel set at the first end 102). According to various exemplary embodiments, the carrier 100 may have any number of wheel configurations including, but not limited to, four, eight, or twelve wheels.

The carrier 100 is further shown as including an occupant compartment or cab 110 supported by the chassis that includes an enclosure or area capable of receiving a human operator or driver. The cab 110 is carried and/or supported at the first end 102 of the chassis and includes controls associated with the manipulation of the carrier 100 (e.g., steering controls, throttle controls, etc.) and optionally may include controls for manipulating the deck assembly 200 and/or a towing apparatus, such as an underlift system 112 provided at the second end 104.

Supported by a rear portion of the chassis is a sub-frame assembly (not shown) configured to movably support the deck assembly 200 on the chassis. One or more powered actuator devices (e.g., hydraulic cylinders, screw actuators, etc.) may be provided for moving the sub-frame assembly and/or the deck assembly 200 between the stowed or transport position, illustrated in FIG. 1, and a tilted loading position (not shown). When it is desired to move the deck assembly 200 to the tilted loading position, the one or more actuator devices tilts the sub-frame assembly a relative to the chassis and moves the deck assembly 200 rearwardly relative to the sub-frame assembly until a free end of the deck assembly 200 is adjacent to the ground. Once in the loading position, a vehicle to be transported (e.g., a disabled vehicle, etc.), and/or any other load to be carried by the carrier 100, can be moved onto a deck surface 206 of the deck assembly 200, by winch 114 or some other means, and the deck assembly 200 may then move back into the transport position.

Referring now to FIGS. 2 through 5, the deck assembly 200 is shown according to an exemplary embodiment. The deck assembly 200 generally includes the deck portion 202 and the undercarriage or sub-structure 204. The deck portion 202 defines a deck surface 206 configured to support a vehicle or other object being transported, while the sub-structure 204 is configured to provide support to the deck surface 202 (e.g., rigidity to reduce deflection, torsion, bending, etc.). Disposed between the deck portion 202 and the sub-structure 204 is the intermediate layer 208.

Figure 3:
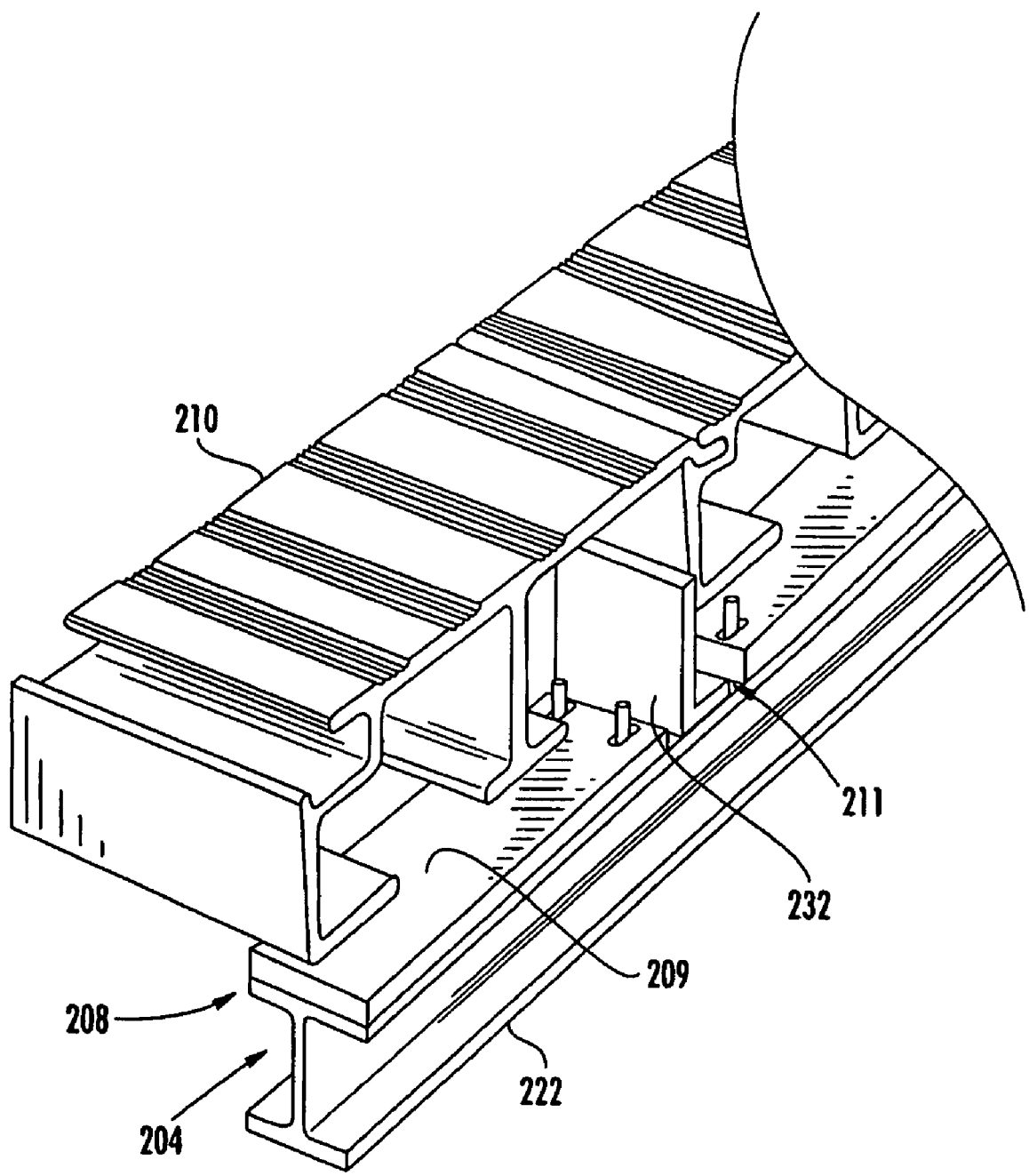
FIG. 3 is a partial perspective cutaway view of the deck assembly shown in FIG. 1.

The relationship between the deck portion 202, the sub-structure 204, and the intermediate layer 208 is best shown in FIG. 3. FIG. 3 is a cross-sectional side view of the deck assembly 200 according to an exemplary embodiment which has been divided into three segments: a first segment showing only the sub-structure 204, a second or middle segment showing the sub-structure 204 in combination with the intermediate layer 208, and a third segment showing the deck portion 202 in combination with the intermediate layer 208 and the sub-structure 204. In the third segment, the intermediate layer 208 is shown as separating (e.g., disposed between, offsetting, displacing, etc.) the deck portion 202 from the sub-structure 204.

Figure 2:
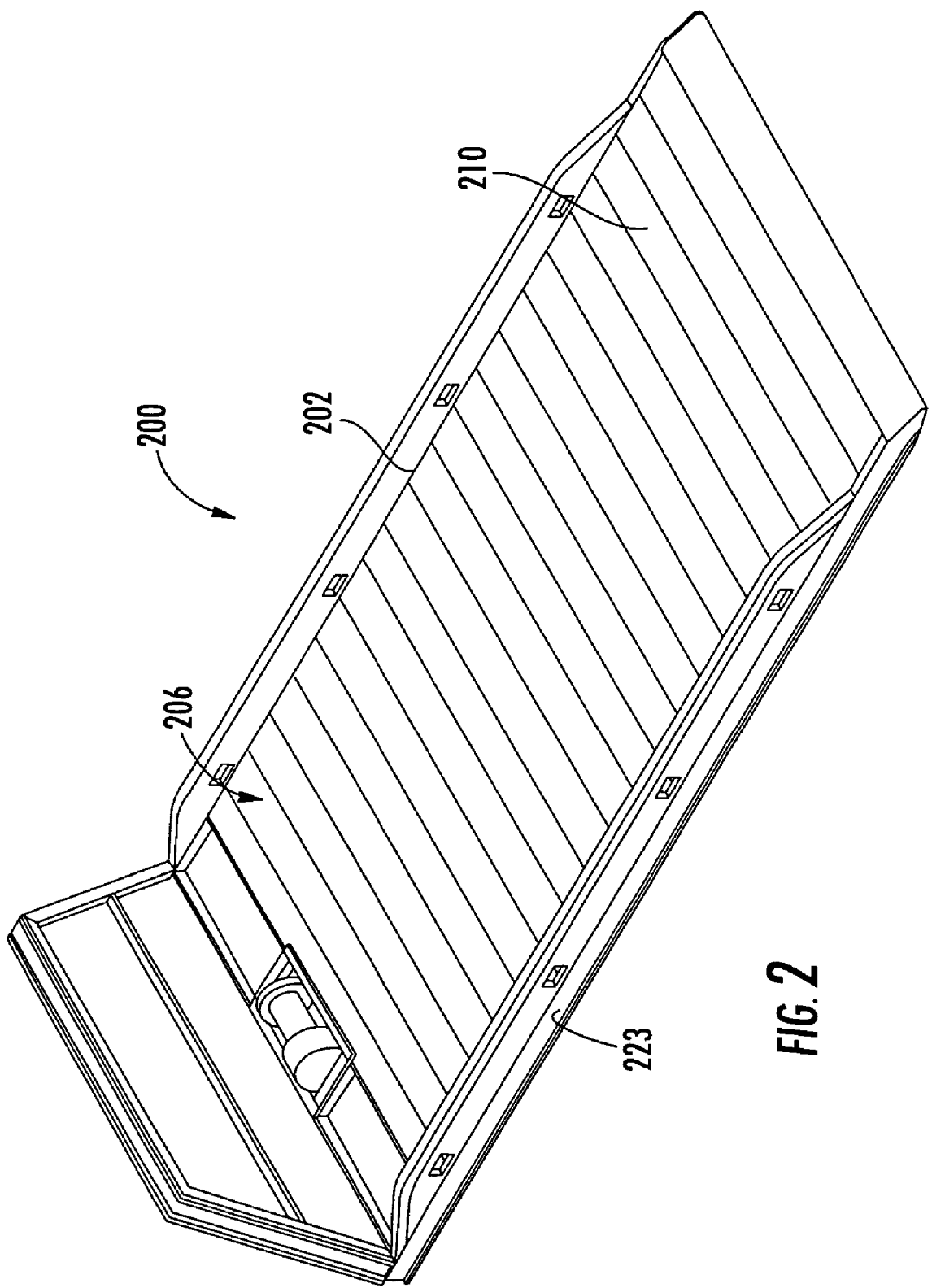
FIG. 2 is a perspective view of the deck assembly shown in FIG. 1.

Referring to FIG. 2, the deck portion 202 includes a plurality of deck panels or planks 210 which when abutted together or otherwise combined to define the deck surface 206. The deck planks 210 are formed of a first material which is a relatively light weight material and corrosion resistant. According to an exemplary embodiment, the deck planks 210 are formed of aluminum. According to a preferred embodiment, the deck panels 210 are extruded aluminum members formed of a high strength 6061-T6 or 6005-T6 aluminum with a minimum yield strength between approximately 37,000 and 40,000 pounds square inch (psi). As is generally known by persons of ordinary skill in the art, the coefficient of thermal expansion for aluminum, including its alloys, is approximately $13 \times 10^{-6}$ in./in./° F. According to various alternative embodiments, the deck planks 210 may be formed of any other suitable material having similar properties and/or advantages of aluminum (e.g., light weight, resistant to corrosion, etc.).

Figure 4:
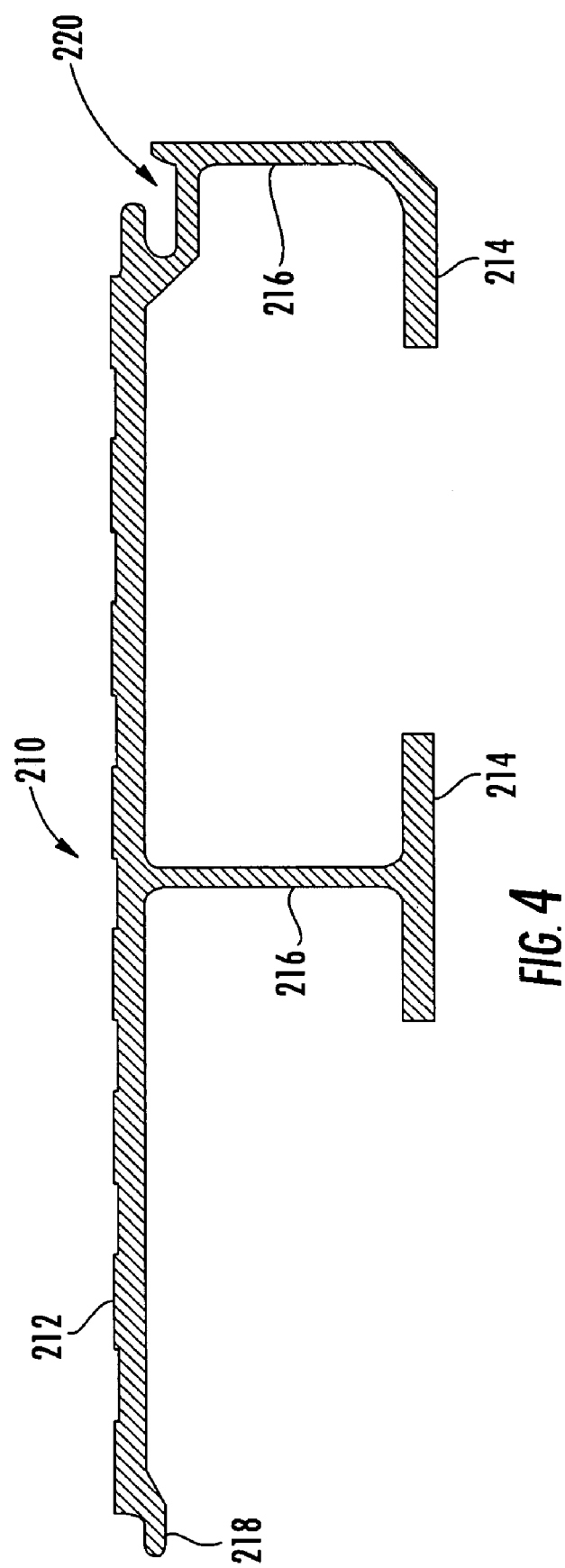
FIG. 4 is a cross sectional view of the deck portion of the deck assembly according to an exemplary embodiment.

The number of deck planks 210 defining the deck surface 206 may vary depending on the overall length of the deck portion 202 and the configuration of the deck planks 210. FIGS. 3 and 4 illustrate a cross sectional view of a deck plank 210 according to an exemplary embodiment. The deck plank 210 is shown as including a substantially horizontal upper platform 212 for providing the deck surface 206 and a number of support feet (shown as flanges 214) formed at a lower end of a respective web 216. According to the embodiment illustrated, the deck plank 210 includes a first web 216 and flange 214 at an end of the upper platform 212 and a second web 216 and flanges 214 substantially in the middle of the upper platform 212. According to an exemplary embodiment, the flanges 214 and/or the web 216 are integrally formed with the upper platform 212. According to various alternative embodiments, the flanges 214 and/or web 216 may be formed as one or more separate members and subsequently coupled to the upper platform 212.

The deck planks 210 illustrated in the FIGURES have a configuration that allows them to be interlocked with one another in a manner that restricts movement of individual deck planks 210 in both a longitudinal (e.g., a fore and aft direction of the carrier 100, etc.) and a vertical direction. According to the embodiment illustrated, the deck plank 210 includes a projection 218 outwardly extending from a first end of the upper platform 212 and a slot 220 (e.g., groove, channel, recess, etc.) provided at an opposite second end of the upper platform 212 (i.e., the end having the web 216 and flange 214) for receiving the projection 218 at the first end of an adjacent deck plank 210.

During assembly of the deck portion 202, one deck plank 210 is tilted relative to an adjacent deck plank 210 to insert and seat the projection 218 into the slot 220 of the adjacent deck plank 210. The tilted deck plank 210 can thereafter be returned to a substantially horizontal position to interlock the deck planks 210. Once interlocked, adjacent deck planks 210 may be further coupled to one another, for example by using a welding operation or any other suitable coupling means (e.g., friction fit, mechanical fastener, etc.) The flanges 214 provide a structure for coupling the deck planks 210 to the sub-structure 204. According to various exemplary embodiments, the deck planks 210 may have any of a number of suitable cross-sectional profiles having an upper platform and a structure for coupling the deck planks 210 to the sub-structure 204.

Referring further to FIG. 3, the deck planks 210 are supported by the sub-structure 204. The sub-structure 204 generally includes one or more support beams (shown as a first frame member 222) extending in a longitudinal direction (e.g., fore and aft direction of the carrier 100, etc.). The deck planks 210 are aligned substantially perpendicular (i.e., traverse, etc.) to the first frame member 222. According to an exemplary embodiment, the deck planks 210 extend beyond (i.e., overhang, etc.) the first frame members 222 in both an outwardly and inwardly direction. In such an embodiment, a sideboard 223 (shown in FIG. 2) may be provided to cap (e.g., seal, etc.) and/or support the free ends of the deck planks 210.

Figure 5:
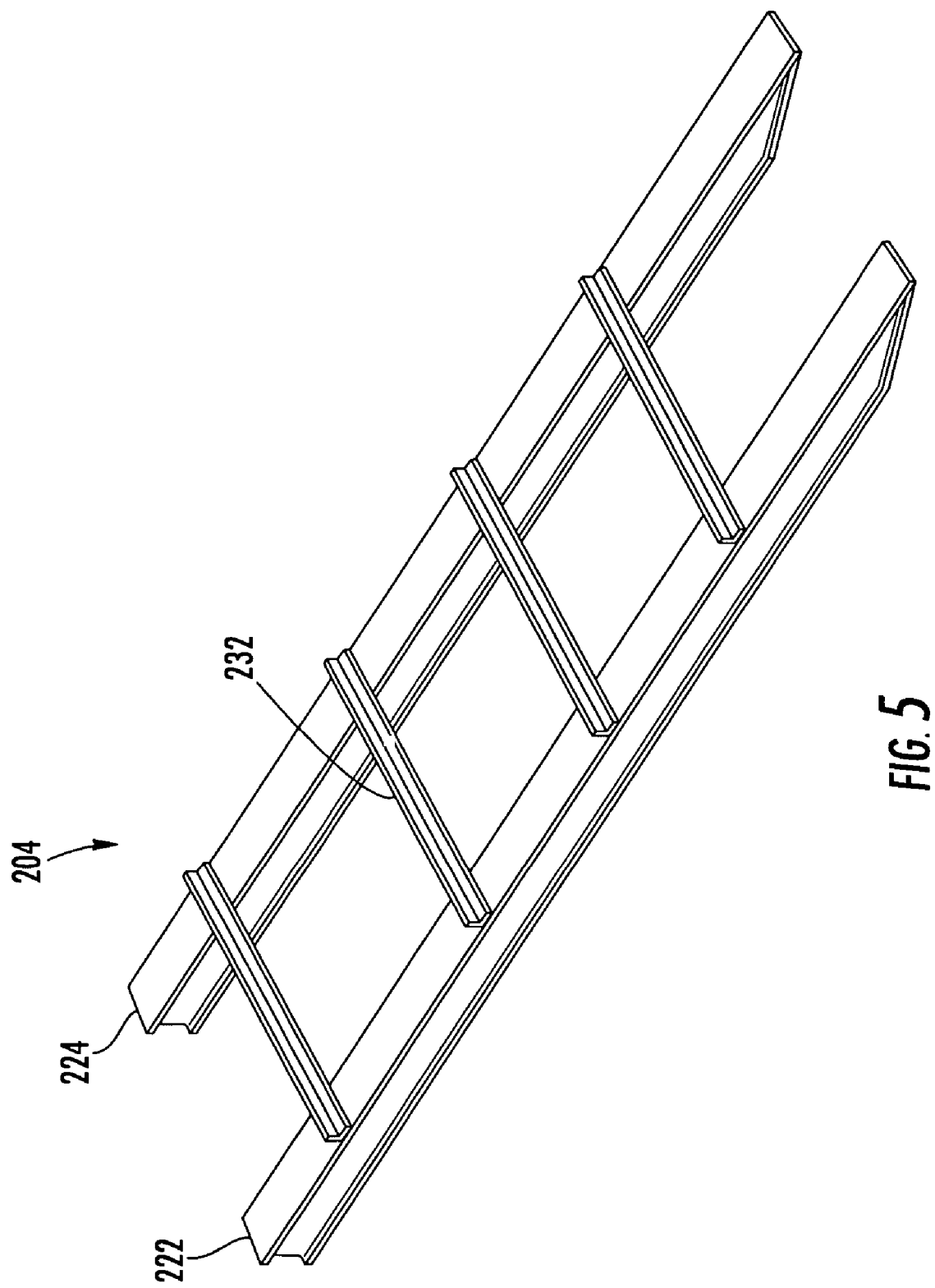
FIG. 5 is a perspective view of a sub-structure of the deck assembly shown in FIG. 1.

Referring now to FIG. 5, a perspective view of the sub-structure 204 without the deck portion 202 and the intermediate layer 208 is shown according to an exemplary embodiment. In FIG. 5, the sub-structure 204 is further shown as including a second frame member 224. The first and second frame members 222, 224 are shown as two generally parallel and spaced-apart beams extending in the fore and aft direction of the carrier 100. The first and second frame members 222, 224 are configured as elongated structural or supportive members (e.g., a rail, channel, tubing, extrusion, etc.) and may be movably supported relative to the sub-frame of the carrier 100.

FIGS. 7 through 10 show a cross-sectional view of the first frame member 222 according to an exemplary embodiment. Each of the first and second frame members 222, 224 are shown as comprising a web portion 226 extending vertically between a substantially horizontal upper flange 228 and a lower flange 230 which provide for an I-beam structural beam. According to various alternative embodiments, the first and second frame members 222, 224 may have any of a number suitable configurations for supporting the deck surface 202 (e.g., tubular, angle, C-channel, etc.).

The first and second frame members 222, 224 are formed of a second material which is a relatively rigid material in comparison to the material forming the deck portion 202. According to an exemplary embodiment, the first and second frame members 222, 224 are formed of steel. As is generally known by persons of ordinary skill in the art, the coefficient of thermal expansion for steel is approximately $7 \times 10^{-6}$ in./in./° F. According to a preferred embodiment, the first and second frame members 222, 224 are formed of a hot-dip galvanized steel with a minimum yield strength of approximately 36,000 pounds square inch (psi), per ASTM Spec. A-36. The galvanized zinc coating may allow the sub-structure 204 to have a useful life of approximately 35 to 40 years. The galvanized zinc coating may also create a protective layer between the material used to form the deck portion 202 (e.g., aluminum, etc.) and the steel thereby reducing the likelihood of corrosion due to dissimilar metal interaction. According to various alternative embodiments, the first and second frame members 222, 224 may be formed of any other suitable material having similar properties of steel (e.g., high strength, rigid, etc.).

Referring further to FIG. 5, the sub-structure 204 is shown as further including a plurality of cross support members 232. The cross support members 232 further brace the deck assembly 200 to reduce torsion and/or bending. The cross-support members 232 are shown as extending laterally between the first frame member 222 and the second frame member 224. In such an embodiment, the cross support members 226 cooperate with the first and second frame members 222, 224 to form a ladder-type frame assembly. According to a preferred embodiment, the cross members 232 are formed of the same material as the first and second frame members 222, 224, but alternatively, may be formed of any other suitable material.

According to an exemplary embodiment, the cross members 232 are coupled to the first and second frame members 222, 224 along a top surface of the first and second frame members 222, 224. Coupling the support members 232 in this position may provide additional clearance for the sub-frame assembly of the carrier 100 and/or other components (e.g., the underlift system 112, etc.). According to the embodiment illustrated, the cross support member has a substantially L-shaped cross-section. According to various alternative embodiments, the cross support member 232 may be disposed anywhere about the first and second frame members 222, 224 (e.g., on a bottom surface, centrally located, etc.) and may be formed of any of a variety of suitable cross sections (e.g., tubular, solid, C-channel, I-beam, etc.).

To facilitate coupling the deck portion 202 to the sub-structure 204, and/or to compensate for any differences in thermal expansion that may exist between the material forming the deck portion 202 and the material forming the sub-structure 204, the intermediate layer 208 (e.g., an interface plate, a plurality of interface plates, etc.) is provided. As shown in FIG. 3, the intermediate layer 208 is provided between the deck portion 202 and the sub-structure 204. The intermediate layer 208 generally includes an interface member or plate 209 provided along the top surface of the first and second frame members 222, 224.

According to an exemplary embodiment, the deck portion 202 is coupled to the interface plate 209 and the interface plate 209 is in turn coupled to the sub-structure 204. According a preferred embodiment, the deck portion 202 is coupled to the interface plate 209 using a welding operation. In such an embodiment, the flanges 214 of deck planks 210 may be directly welded to the interface plates 209. According to various alternative embodiments, the deck portion 202 may be directly or indirectly coupled to the interface plate 209 using any of a variety of suitable coupling means (e.g., mechanical fasteners, indirect welding, etc.).

The interface plates are preferably coupled to the first and second frame members 222, 224 using one or more mechanical fasteners (e.g., bolts, screws, pins, rivets, clips, etc.). As shown in detail in FIG. 6, the interface plates 209 may be coupled to the first and second frame members 222, 224 using bolts and nuts. According to an exemplary embodiment, the bolts and nuts are configured resist twisting or turning resulting from the relative thermal expansion between the deck portion 202 and sub-structure 204 which may cause a loss of torque and fastener strength. To resist twisting, an opening in the sub-structure 204 through which the bolt passes through is formed with a non-circular cross section corresponding to the cross section of neck or operating head of the bolt. For example, the opening in the sub-structure 204 may be substantially rectangular to correspond to a square-neck carriage bolt. This configuration prevents rotation movement of the bolt once inserted through the opening.

Figure 8:
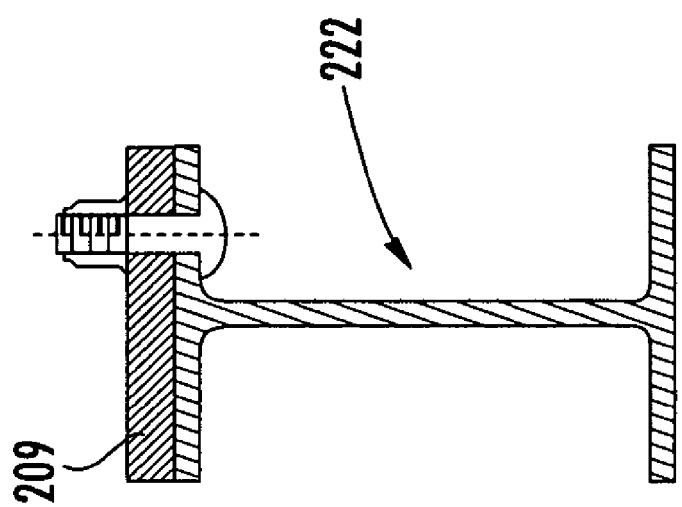
FIG. 8 a cross sectional view of the deck assembly taken substantially along the line 8-8 of FIG. 6.
Figure 7:
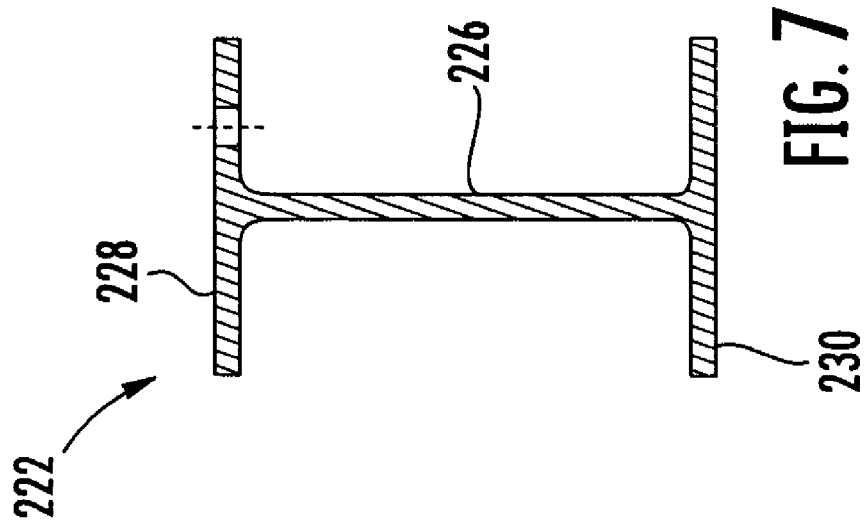
FIG. 7 a cross sectional view of the deck assembly taken substantially along the line 7-7 of FIG. 6.
Figure 10:
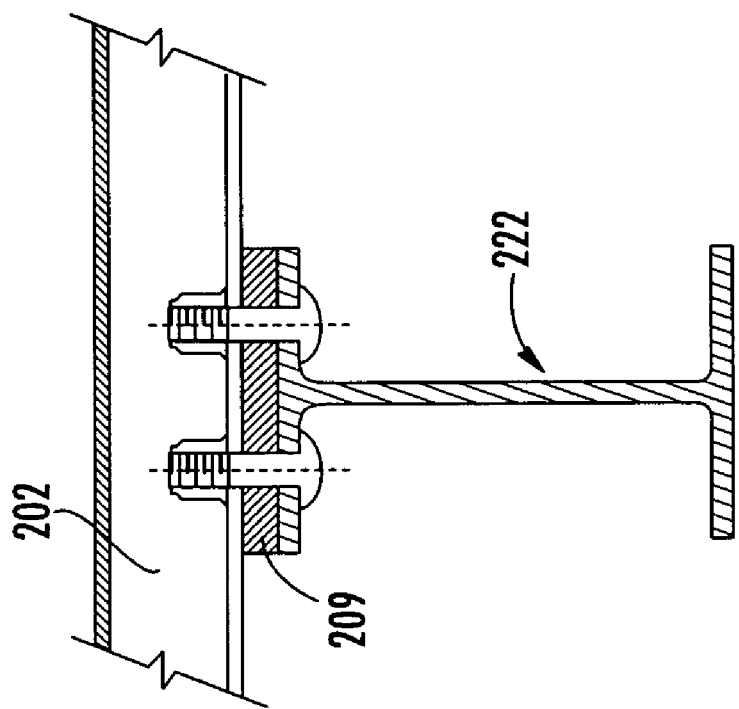
FIG. 10 a cross sectional view of the deck assembly taken substantially along the line 10-10 of FIG. 6.
Figure 9:
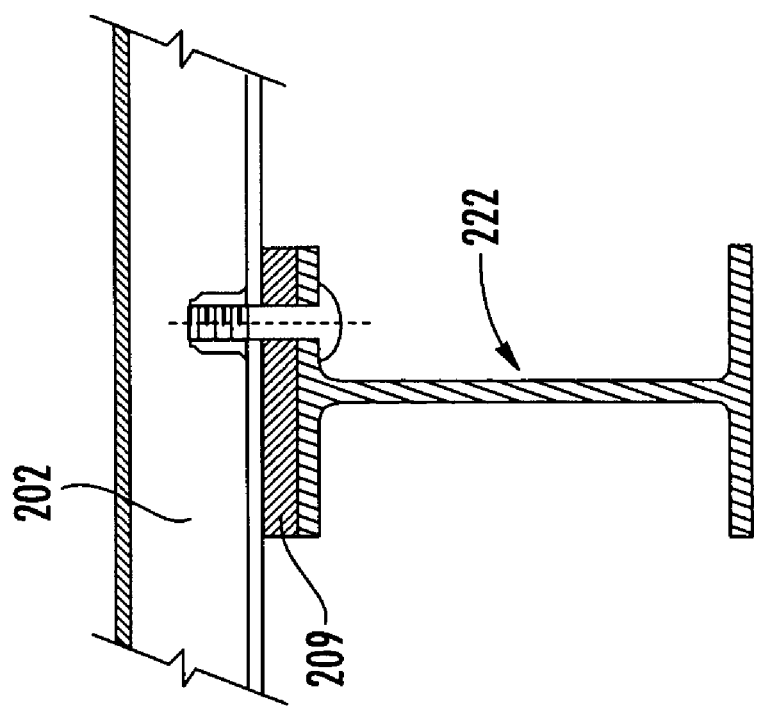
FIG. 9 a cross sectional view of the deck assembly taken substantially along the line 9-9 of FIG. 6.

FIGS. 8 and 9 illustrate a single bolt and nut being used to fasten the interface plate 209 to the first support frame 222 at each coupling location along the first support beam 222. FIG. 10 illustrates two bolts and nuts being used to fasten the interface plate 209 to the first support frame 222 near the rear portion of the deck assembly 200. Providing the additional bolt and nut at the rear portion of the deck assembly 200 may further strength the joint at a location susceptible to receive the most force. According to various alternative embodiments, any number of bolts or other fasteners may be used in fasten the interface plate 209 to the first support beam 222.

According to an exemplary embodiment, an opening formed in the interface plates 209 through which the bolt passes through is slotted (e.g., elongated, oblong, etc.) in a longitudinal direction to further compensate for differences in thermal expansion that may exist between the interface plate 209 and the sub-structure 204. For example, the opening in the interface plate 209 may be approximately 0.75 inches long to allow relative expansion around a 0.50 inch diameter carriage bolt. According to various alternative embodiments, the openings provided in the sub-structure 204 and/or the interface plates 209 may have any of a number of configurations for receiving a mechanical fastener used to couple the interface plate 209 to the sub-structure 204.

The interface plate 209 is preferably formed of a material that allows the deck portion 202 to be coupled to the interface plate 209 using a welding operation and which will reduce the relative thermal expansion between the deck portion 202 and the sub-structure 204. For example, the interface plate 209 may be formed of a material having a coefficient of thermal expansion substantially the same as a coefficient of thermal expansion of the material used to form the deck portion 202. Preferably, the material forming the intermediate layer 208 is the same material forming the deck portion 202 (e.g., aluminum, etc.).

According to an exemplary embodiment, the intermediate layer 208 comprises a plurality of interface plates 209 disposed between the deck planks 210 of the deck portion 202 and the first and second frame members 222, 224 of the sub-structure 204. Referring to FIG. 6, each interface plate 209 is provided along a different segment of the first and second frame members 222, 224 and is spaced apart from the remainder of the interface plates 209. A gap 211 between the interface plates 209 is sufficiently sized to allow the deck portion 202 and the sub-structure 204 to expand and contract relative to each other due to the different coefficients of the thermal expansion without adversely affecting the joint between the deck portion 202 and the sub-structure 204 (e.g., a weld joint between the deck planks 210 and the interface plates 209, etc.). The gap 211 may also be sufficiently sized to receive the cross support member 232 of the sub-structure 204 used for further bracing the deck assembly 200. According an exemplary embodiment, the gap 211 is greater than approximately 0.30 inches. According to various alternative embodiments, the gap 211 may be greater or less than 0.30 inches to provide a desired amount of clearance for relative thermal expansion and/or to receive the cross support member 232.

According to an exemplary embodiment, each interface plate 209 of the intermediate layer 208 is between approximately 20 percent and 25 percent of the total surface of the first and second frame members 222, 224. In such an embodiment, approximately five interface plates 209 are provided on each of the first and second frame members 222, 224 or ten interfaces plates 209 total.

It is important to note that the construction and arrangement of the deck assembly as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, elements shown as multiple parts may be integrally formed, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the exemplary embodiments without departing from the scope of the present inventions as expressed in the appended claims.

What is claimed is:

1. A deck assembly for a transporter vehicle, the deck assembly comprising:
a deck portion defining a deck surface and formed of a first material;
a sub-structure including a first support beam having a length and formed of a second material;
an interface portion directly coupled to the first supported beam using a mechanical fastener passing through a first opening in the support beam and a second opening in the interface portion and separating the deck portion from the sub-structure; and
wherein the deck portion is directly coupled to the interface portion using a welding operation, wherein the first material has a coefficient of thermal expansion that is different than a coefficient of thermal expansion for the second material and wherein the opening in the interface portion is elongated in a longitudinal direction for allowing the interface portion to expand relative to the sub-structure.

2. The deck assembly of claim 1, wherein the interface portion comprises a plurality of interface plates coupled to the first support beam, each interface plate being coupled to a different segment of the length of the first support beam and spaced apart from the remainder of the interface plates.

3. The deck assembly of claim 2, wherein each interface plate has a length between approximately 20 percent and approximately 25 percent of a total length of the first support beam.

4. The deck assembly of claim 3, wherein a gap is provided between adjacent interface plates to compensate for differences in thermal expansion between the first material and the second material.

5. The deck assembly of claim 4, wherein a gap between the interface plates is at least 0.30 inches.

6. The deck assembly of claim 2, wherein the sub-structure further comprises:
a second support beam extending parallel to and laterally offset from the first support beam; and
at least one cross support member coupled between the first support beam and the second support beam,
wherein the cross support member is provided in a gap defined by adjacent interface plates.

7. The deck assembly of claim 6, wherein the deck portion comprises a plurality of planks which extend generally traverse over the first support beam and the second support beam and generally parallel over the cross support member.

8. The deck assembly of claim 1, wherein the deck portion and the interface portion have substantially the same coefficient of thermal expansion.

9. The deck assembly of claim 8, wherein deck portion and the interface portion are formed of aluminum.

10. The deck assembly of claim 9, wherein the first support beam of the sub-structure is formed of steel.

11. A transporter vehicle comprising:
a chassis;
a cab supported by the chassis;
a deck assembly supported by the chassis and configured to be tilted relative to the chassis, the deck assembly comprising:
a sub-structure including a first longitudinally extending support beam having an upper surface, a length and formed of a first material;
an interface plate supported at the upper surface and coupled along the length of the first support beam, the interface plate being formed of a second material; and
a deck portion welded to the interface plate and formed of the second material,
wherein the first material has a coefficient of thermal expansion that is less than a coefficient of thermal expansion for the second material.

12. The transporter vehicle of claim 11, wherein the deck assembly further comprises a plurality of interface plates coupled to the first support beam, each interface plate being coupled to a different segment of the length of the first support beam and spaced apart from the remainder of the interface plates.

13. The transporter vehicle of claim 12, wherein the sub-structure of the desk assembly further comprises:
a second support beam extending parallel to and laterally offset from the first support beam; and
at least one cross support member coupled between the first support beam and the second support beam,
wherein the cross support member is provided in a gap defined by adjacent interface plates.

14. The transporter vehicle of claim 13, wherein the first material is steel and the second material is aluminum.

15. A method of assembling a deck assembly for a transporter vehicle comprising:

providing a sub-structure including at least one support beam having an upper surface, a length and formed of a first material;
covering the upper surface with an interface plate formed of a second material;
coupling the interface plate to the support beam; and
welding a deck portion to the interface plate,
wherein the first material has a coefficient of thermal expansion that is less than a coefficient of thermal expansion for the second material.

16. The method of claim 15, further comprising coupling a plurality of interface plates to the support beam and spacing apart the interface plates in a longitudinal direction along the length of the support beam.

17. The method of claim 16, wherein the step of coupling the interface plates to the support beam comprises coupling the interface to the support beam with a mechanical fastener.

18. A carrier configured to transport a vehicle, the carrier comprising:
a chassis;
a deck supported by the chassis, the desk comprising:
at least one support beam having an upper surface and extending in a longitudinal direction, the at least one support being formed of a first material having a first coefficient of thermal expansion;
at least one interface member coupled to the at least one support beam and at least partially covering the upper surface, the at least one interface member being formed of a second material having a second coefficent of thermal expansion that is greater than the first coefficient of thermal expansion; and
a plurality of deck planks welded to the interface member and extending in a direction substantially perpendicular to the at least one support beam, the plurality of deck planks being form of a third material having a third coefficient of thermal expansion that is substantially the same as the second coefficient of thermal expansion.

19. The carrier of claim 18, wherein the at least one support beam comprises a pair of spaced apart support beams.

20. The carrier of claim 19, further comprising at least one cross support member extending between the support beams above the upper surfaces of the support beams.

21. The carrier of claim 20, wherein the at least one interface member comrprises a plurality of interface plates spaced apart from each other to form a gap.

22. The carrier of claim 21, wherein the at least one cross support member is supported in the gap between the plurality of interface plates.

* * * * *

UNITED STATES PATENT AND TRADEMARK OFFICE
CERTIFICATE OF CORRECTION

PATENT NO.       : 7,264,305 B2                                              Page 1 of 1
APPLICATION NO.  : 11/255190
DATED            : September 4, 2007
INVENTOR(S)      : Sanjeev Kuriakose It is certified that error appears in the above-identified patent and that said Letters Patent is hereby corrected as shown below:

Column 10:  Line 34; after "chassis;" insert --and--

Column 12:  Line 3; replace "coefficent" with --coefficient--

Column 12:  Line 20; replace "comrprises" with --comprises--

Signed and Sealed this

Eighteenth Day of December, 2007

JON W. DUDAS
*Director of the United States Patent and Trademark Office*